United States Patent
Denison

(10) Patent No.: US 12,346,993 B2
(45) Date of Patent: Jul. 1, 2025

(54) MERGING MULTIPLE IMAGES AS INPUT TO AN AI IMAGE GENERATION ALGORITHM

(71) Applicant: Sony Interactive Entertainment Inc., Tokyo (JP)

(72) Inventor: Charlie Denison, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 64 days.

(21) Appl. No.: 18/076,408

(22) Filed: Dec. 7, 2022

(65) Prior Publication Data

US 2024/0193821 A1    Jun. 13, 2024

(51) Int. Cl.
| | |
|---|---|
| G06T 11/00 | (2006.01) |
| G06F 3/0482 | (2013.01) |
| G06F 3/04845 | (2022.01) |
| G06F 40/40 | (2020.01) |
| G06V 10/44 | (2022.01) |

(52) U.S. Cl.
CPC ........... *G06T 11/00* (2013.01); *G06F 3/0482* (2013.01); *G06F 3/04845* (2013.01); *G06F 40/40* (2020.01); *G06V 10/44* (2022.01); *G06T 2200/24* (2013.01)

(58) Field of Classification Search
None
See application file for complete search history.

(56) References Cited

U.S. PATENT DOCUMENTS

2010/0283832 A1* 11/2010 Lin .................. G06F 18/256
                                                          348/46
2019/0163768 A1*  5/2019 Gulati ................ G06F 16/56

OTHER PUBLICATIONS

ISR & WO PCT/US2023/082066, dated Mar. 7, 2024, Total 10 pages.
Anwaar Muhammad Umer et al: "Compositional Learning of Image-Text Query for Image Retrieval", ArXiv, May 31, 2021 (May 31, 2021), pp. 1-9, XP093134553, Retrieved from the Internet: URL:https://arxiv.org/pdf/2006.11149.pdf [retrieved on Feb. 23, 2024] pp. 1, 2, 8.

* cited by examiner

*Primary Examiner* — Yanna Wu
(74) *Attorney, Agent, or Firm* — Kilpatrick Townsend & Stockton LLP

(57) ABSTRACT

Methods and system for fine tuning an image generated by an image generation artificial intelligence process includes receiving a generated image for a user prompt. The generated image is analyzed to identify image features included within. The identified image features are presented on a user interface for user selection for fine tuning. Selection of an image feature at the user interface is detected and an adjusted image is generated by fine tuning the selected image feature in accordance to tuning comments so that the image feature exhibits a style expressed by the user. The adjusted image is returned to the client device for rendering.

18 Claims, 10 Drawing Sheets

MERGING MULTIPLE IMAGES AS INPUT TO AN AI IMAGE GENERATION ALGORITHM

FIELD

The present disclosure relates to systems and methods for providing an image generated by an image generation artificial intelligence process for a text prompt provided by a user.

BACKGROUND

With the growing amount of interactive content available online, users have the ability to search for and receive content that satisfies their search query. One area where the users are unable to receive customized content that matches their search query and their true intent is with images. When a user searches for images by entering keywords or phrases, the images that are returned do not contextually match with their true search intent.

In order for a user to have a satisfactory image search experience, it is necessary to understand the context of the query and the true intent of the user so as to return images that satisfy the user's true intent and contextually match the search query.

It is in this context that embodiments of the invention arise.

SUMMARY

Implementations of the present disclosure relate to systems and methods for receiving a query prompt from the user and returning a generated image that matches the context of the query prompt and the intentions of the user.

Typically, the query prompt is received as text provided by the user. As the user is typing text, a search tool interprets the text and uses a text-to-image conversion tool to identify the images that match the keywords in the text and returns an image that is influenced by the keywords. In identifying the images and returning the image, the search tool interprets the text provided by the user literally and generates the image based on such interpretation. The keywords entered by the user in the query prompt can have a context. As the user continues to enter additional text in the query prompt, the additional keywords can change the context of the keywords. The tool uses the change in context to identify a different image that satisfies literal interpretation of the keywords including the additional text entered by the user in the query prompt. Thus, any change in the query prompt or any attempts to influence changes to a feature of the image generated for the query prompt results in the tool generating a totally different image in an attempt to satisfy the query prompt.

To generate a more customized and contextually relevant image for the query prompt, the tool provides the user with a user interface for providing the initial query prompt. Based on the query prompt, the tool generates an image that satisfies the context and intent of the user that is influenced by the choice of keywords and keyword sequences expressed in the query prompt. The user can use the generated image to influence change to one or more image features, in order to customize the generated image. The query prompt is used interchangeably with the user prompt to refer to initial search query provided by the user. The search query can be in the form of text input and/or image input. The text input includes keywords, and when more than one keyword is present, one or more keyword sequences. The keywords and any keyword sequence(s) of the initial search query are analyzed to determine the context. An image representing the query prompt is generated such that the generated image includes visual representation of each of the keywords identified in the query prompt, and is in accordance to the context of the query prompt.

In addition to the query prompt (i.e., initial search query), the user interface is also used to select an image feature included in the generated image for the query prompt and tune the selected image feature so as to influence a style specified for the image feature. The tuning of the selected image feature results in the generation of an adjusted image for the generated image, wherein the adjusted image includes the change to the image feature. The specification for tuning the image feature can be provided in a text input. In addition to the text input, the tuning can also be provided as an image input. Where an image input is provided, additional text input can be provided to use a certain feature within the image input for influencing change in the image feature of the generated image. The additional text input can be provided in annotation form on the image input. The tuning to the generated image is done by influencing change to the image feature in accordance to the text input and, where available, the image input. The tuned adjusted image represents the style specified by the user and represents a contextually relevant and customized representation of the query prompt of the user.

In one implementation, a method for tuning an image generated by an image generation artificial intelligence (IGAI) process, is disclosed. The method includes receiving a generated image for the user prompt. The generated image includes image features influenced by content provided in the user prompt. The generated image provides a visual representation of the user prompt. The generated image is analyzed to identify the image features included within. The image features identified in the generated image are presented on a user interface of a client device for user selection for tuning. Selection of an image feature for tuning is detected at the user interface. The selection of the image feature further includes tuning comment from a user. The tuning comment is used to influence the IGAI to steer the image feature of the generated image to exhibit a style expressed in the tuning comment. An adjusted image is generated for the generated image by tuning the image feature of the generated image selected at the user interface. The tuning is performed by influence a change in the image feature in accordance to the tuning comment so that the image feature in the adjusted image exhibits the style expressed by the user. The adjusted image is returned to the client device for rendering, in response to a request to tune the generated image received from the user.

In an alternate implementation, a method for tuning an image generated by an image generation artificial intelligence process is disclosed. The method includes receiving a generated image based on a user prompt. The generated image includes image features influence by content provided in the user prompt and provides a visual representation of the user prompt. The generated image is analyzed to identify the image features included within. A node map for the generated image is presented on a user interface of a client for user selection. The node map0 includes a plurality of nodes that correspond with the image features identified in the generated image. A selection of a node from the node map is detected. The node corresponds to an image feature of the generated image selected for tuning. The selection includes tuning comment from a user, wherein the tuning comment is used to influence the IGAI to steer the image feature to exhibit a style expressed in the tuning comment. An adjusted image is generated for the generated image by tuning the image feature associated with the node selected at the user interface. The tuning is performed by influence a change in the image feature in accordance to the tuning comment so that the image feature in the adjusted image exhibits the style expressed by the user in the tuning comment. The adjusted image is returned to the client device for rendering, in response to a request to tune the generated image received from the user.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIGS. 4C-1 and 4C-2 illustrate an example of a generated image that is fine tuned using tuning comments provides at a user interface, in accordance with one implementation.

DETAILED DESCRIPTION

Figure 1:
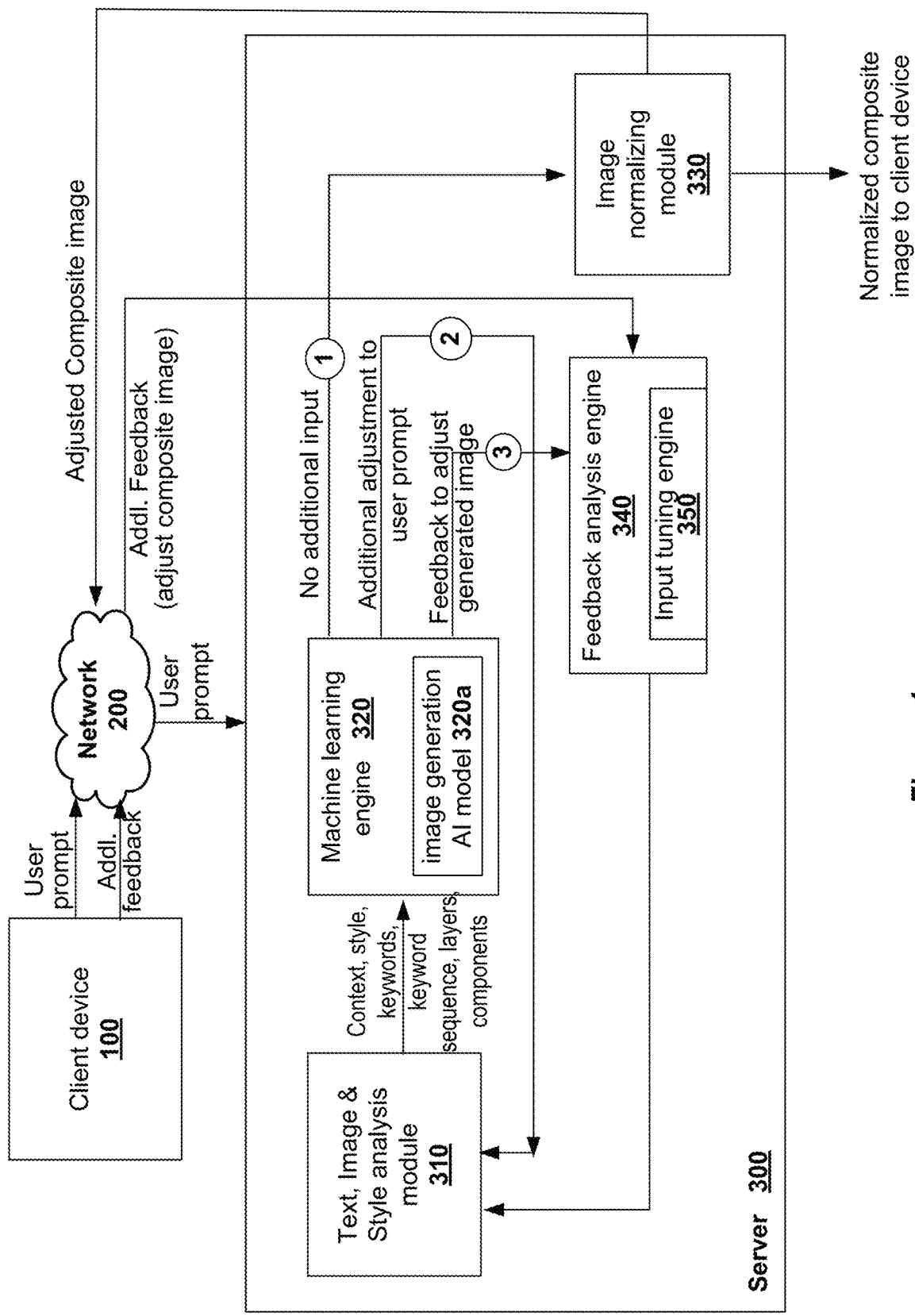
FIG. 1 represents a simplified block diagram of a system used to generate a generated image for a user prompt and to fine-tune the generated image based on feedback received from the user, in accordance with one implementation.

Systems and methods for tuning an image generated for a user prompt received from a user, are described. It should be noted that various implementations of the present disclosure are practiced without some or all of the specific details. In other instances, well known process operations have not been described in detail in order not to unnecessarily obscure various embodiments of the present disclosure.

The various implementations described herein allow an image generation artificial intelligence (IGAI) process to receive a user prompt from a user and, in response, generate an appropriate generated image that provides a visual representation of the user prompt. The generated image is returned to a client device of the user for rendering. The generated image includes a plurality of image features that are influenced by content of the user prompt, wherein the content of the user prompt includes text input and, in some cases, image input. The text input includes keywords and, where there is more than one keyword, keyword sequence. The choice of the keywords and keyword sequence(s) influence the generation of the generated image. The user may accept the generated image returned for the user prompt or may wish to further customize the generated image by providing feedback. The feedback can be in the form of selection of an image feature from the generated image and tuning comments to influence the tuning of the selected image feature. The tuning comments can be in the form of text input, and in some cases, image input. The text input can include specific instructions to the IGAI to influence the change to the selected image feature in the generated image. In some implementations, the text input can be from a pre-defined option identified for the image feature, wherein the pre-defined option identifies a style that the IGAI has to use to influence the change in the image feature. The IGAI uses the tuning comments to generate the adjusted image for the generated image, wherein the adjusted image includes the image feature with the change influenced by the tuning comment. Similar to the text input, the image input provided in the tuning comments identifies a specific feature within the image input that the IGAI can use to influence a style of the image feature of the generated image. In some implementations, in addition to identifying the specific feature identified in the image input, a text input can be provided either in a separate text field on the user interface or in the form of an annotation over the image feature identified in the image input, wherein the annotation is provided using an annotation tool. In some implementations, the image input can be the generated image itself with the image feature that is to be tuned highlighted or otherwise identified, and text input identifying specific changes to be applied by the IGAI to influence the identified image feature. In some cases, the image input can be provided at the user interface and a node map associated with the image input can also be provided at a tuning interface defined within the user interface. The node map is generated to include a plurality of nodes, with each node in the node map corresponding to an image feature identified from the image input. The node map shows the interconnectivity between the nodes to correspond with the inter-relationship between the image features of the image input. When the image input is the generated image itself, selection of a node from the node map for tuning would result in the selection of the corresponding image feature of the generated image for tuning. Tuning comments provided in the form of text input and/or annotations are used to influence the change to the image feature so as to exhibit a style specified by the user.

The process of receiving image feature selection of the generated image and the tuning comments from the user continues till the user is satisfied with the changes included in the adjusted image. The adjusted image resulting from the tuning is a unique and customized visual representation of the user prompt that is designed using the user's inputs. The generated image designed by the user can be used to represent a virtual object, such as a virtual game character for a video game, a virtual logo for use to represent a person, a company, an event or for use in creating articles of use, or a virtual art work, etc. The generated image can be generated in two-dimensions or three-dimensions, and the fine-tuning can be performed accordingly to generate additional custom generated images to represent additional virtual objects for the user or for the video game.

Current text-to-image tools interpret the keywords included in the user prompt literally to generate the image for the user prompt. However, the images that are generated from such tools are not a true interpretation and contextual representation of the user prompt as the tools use the keywords without understanding the relationship between the keywords and context of the user prompt. For example, if the user prompt is, "make a movie poster in the style of red dawn," the existing text-to-image tools would interpret the user prompt literally to mean color red for keyword "red", sunrise for keyword "dawn", etc. The tools used do not have the ability to understand the concept of the user's true intentions represented in the keywords included in the user prompt and the relationship between the keywords (i.e., context) to recognize that the user may have been alluding to a movie title, a game title, a song title, an event, etc. Thus, by literally interpreting the keywords of the user prompt, the tools generated an image that included a red poster and a view of sunrise, while the user's true intention may be alluding to a movie poster that is styled similar to a movie by name "Red Dawn".

An analysis tool together with a tuning tool of the various implementations described herein overcomes the issues of literal interpretation of the keywords of the currently existing tools. For instance, the analysis tool used in the various implementations described herein not only identifies the keywords but also the sequence of keywords and determines the context of the user prompt by understanding the relationship between the keywords. The analysis tool recognizes the concept alluded to by the user based on the user's choice of keywords and feeds the result of the analysis as inputs to an image generation artificial intelligence (AI) model to generate an image that makes sense and is contextually relevant to the user prompt. Once the image is generated taking into consideration the context, the intent and concept alluded to by the user in the user prompt, the user can use the fine tuning tool to tune the generated image. The tuning can be done by matching a style of features identified from other images that were uploaded by the user or using text input provided by the user at a tuning interface.

With the general understanding of the disclosure, specific implementations of fine-tuning a generated image generated for a user prompt will now be described in greater detail with reference to the various figures. It should be noted that various implementations of the present disclosure can be practiced without some or all of the specific details. In other instances, well known process operations have not been described in detail in order not to unnecessarily obscure various embodiments of the present disclosure.

FIG. 1 illustrates an example system used for receiving and processing user prompt provided by a user to generate an image representation of the user prompt and for receiving further inputs to tune the generated image so as to customize the generated image for the user prompt, in one implementation. The system includes a client device 100 that is communicatively linked with a server 300 via a network 200, such as the Internet. The client device 100 is associated with the user and includes a display screen for rendering a user interface that is used by the user to provide user prompts, inputs for tuning, and for the system to render the generated image for the user prompt. The user interface, as will be described in more details with reference to FIGS. 4A and 4B, includes an input interface and a tuning interface. The input interface is used by the user to provide the user prompt and tuning inputs. The user prompt can be in the form of text (i.e., keyword(s) provided via text input or voice command) or a source image or both, while the tuning inputs are in the form of image and descriptive text, wherein the descriptive text can be in the form of a voice command or additional text input. The tuning inputs provide directions for identifying certain features of the generated image and for tuning the certain features of the generated image.

The client device 100, in some implementations, includes an encoder to encode the user prompt and forward the user prompt over the network 200 to the server 300 for processing. Similarly, the encoder encodes the tuning inputs and forwards the encoded tuning inputs over the network 200 to the server 300 for processing. The client device 100 can be a thin-client computer, a laptop computer, a desktop computer, a mobile computing device, a head mounted display or any other wearable computing device, or any other computing device that is used by the user and is capable of communicatively connecting to the server 300 over the network 200 to transmit the user prompt and the tuning inputs to generate an image that provides a visual representation of the user prompt and for tuning certain features of the generated image.

To begin with, a user prompt is received at the user interface of the client device, wherein the user prompt includes image and/or text input. The text input includes keyword(s) and, where more than one keyword is provided in the text input, a sequence of keywords. The user prompt is processed and encoded at a coder/decoder (CODEC) module (not shown) available at the client device 100 and the encoded user prompt is transmitted to the server 300 over the network 200 in accordance to communication protocol followed for communicating between the client device 100 and the server 300.

The server 300 can be an independent server (i.e., a stand-alone server (e.g., a console)) or a virtual machine or be part of a cloud system, wherein the cloud system includes a plurality of servers 300 distributed across different geo locations. The server 300 is configured to host a plurality of content or is communicatively connected to different hosts to retrieve appropriately relevant content hosted at the respective hosts. The server 300 is configured to receive and decode the encoded user prompt to extract the user prompt, and process the user prompt received from the client device 100 of the user. The server includes a server-side CODEC (not shown) to receive and decode the encoded user prompt and extract the user prompt. To assist in processing the user prompt, the server 300 includes a plurality of modules (i.e., components or engines). Some of the modules used for processing the user prompt include a text, image and style analysis module (simply referred to henceforth as "analysis module") 310, a machine learning (ML) engine 320, which includes a image generation AI model (or simply referred to henceforth as "AI model") 320a, an image normalizing module 330, and a feedback analysis engine 340 which includes an input tuning engine 350 to process additional inputs that are used for tuning an image generated for the user prompt.

Each of the components or engines on the server 300 used to process the user prompt can be a hardware component or a software component. To illustrate, each of the analysis module 310, the ML engine 320 (with the AI model 320a), the image normalizing module 330, and the feedback analysis engine 340 can be a software program or a portion of a software program that is executed by a separate processor (e.g., AI processor (not shown)) or by the processor of the server 300). The AI model 320a can be a machine learning model or a neural network or an AI model generated and trained using input dataset. In alternate illustrations, each of the analysis module 310, the ML engine 320, the image normalizing module 330 and the feedback analysis engine 340 can be a hardware circuit portion of an application specific integrated circuit (ASIC) or a programmable logic device (PLD).

In addition to the aforementioned modules used for processing user prompt and tuning inputs received from the client device 100, the server 300 can include additional modules for performing other functions, such as executing interactive applications, processing user inputs and updating appropriate interactive applications, generating content for the interactive applications, packaging the generated content and encoding the content for transmission back to the client device 100 for rendering for user consumption. The server also includes memory to store the user prompt, and the one or more modules (e.g., when the one or more modules are software modules) used for processing the user prompt. The stored modules are retrieved from memory and executed by a processor of the server 300, in response to detecting a user prompt at the server 300.

Briefly speaking, when the user prompt is received at the server 300, the analysis module 310 is activated to process the user prompt. As noted, the user prompt can include text and/or an image provided by the user. The analysis module examines the user prompt to determine if the user prompt contains text string or image or both. When the user prompt includes only text string, the analysis module 310 identifies keywords and, when more than one keyword is present, a keyword sequence contained in the user prompt. Using the keywords and any keyword sequence(s) identified, the analysis module determines a context of the user prompt. If the user prompt includes an image (e.g., a source image) along with a text string, the analysis module 310 analyzes the image to identify features contained within and generates text content to describe the features. The text content generated for the source image includes sufficient details to re-create the image. The text content describing the source image is then processed by the analysis module 310 in a manner similar to the text string. If the user prompt includes the source image and the text string, the text content generated for the source image is combined with the text string to generate an aggregate prompt. The aggregate prompt is then analyzed by the analysis module 310 to identify keywords, sequence of keywords and use the keywords, keyword sequences to determine the context of the user prompt. The context with the keywords and the keyword sequence are forwarded to a machine learning (ML) engine 320, which engages the image generation AI model 320a for intelligently use the keywords, keyword sequences in the user prompt and generate an image that is a visual representation of the user prompt. The generated image includes image features, wherein each image feature corresponds with one or more keywords or sequence of keywords and/or context of the user prompt.

In addition to the user prompt, the analysis module 310 can query for and receive a style preferred by the user when generating the image. The style can identify a purpose of the user prompt for which the generated image is being defined. For example, the purpose of the user prompt can be to generate a virtual art object or a digital logo for use in advertisements or for representing a company or event or for using in a wearable or usable product, or a virtual object for use in a virtual interactive application, such as virtual character in a video game, etc. The style can be defined by the user at the user interface before or during the processing of the user prompt. The style for the user prompt is forwarded to the ML engine 320 to assist the ML engine 320 to generate the image for the user prompt that is in accordance to the style specified by the user.

The ML engine 320 engages an image generation AI model (or simply referred to henceforth as "AI model") 320a to use the keywords, keyword sequence, and context determined from the user prompt, as well as the style specified by the user to identify a relevant output for the user prompt. The output of the AI model 320a is an image that matches the style specified by the user, is contextually relevant and provides visual representation of the keywords, keyword sequence and/or context of the user prompt. In some implementations, the AI model 320a engaged by the ML engine 320 is a proprietary AI model that is executed on the server 300 or executed on a different server and accessed using an application programming interface (API). In alternate implementations, the AI model 320a can be a publicly available AI model accessed by the ML engine 320 using an API. In the case where the ML engine 320 accesses the AI model 320a through the API, the ML engine 320 can include the API or can rely on the API on the server 300 to access the AI model 320a. Irrespective of the AI model 320a used by the ML engine 320, the AI model 320a is generated and trained continually using a trained dataset of text prompts and vast amount of images made available by content providers and/or users. The training is done to define the inter-relationship between the various text prompts and the images, and the outputs are defined based on a level of match of the image features included in the images to the different aspects of the text prompt (i.e., keywords, keyword sequences, and/or the context of the user prompt), style or purpose of the user prompt, etc. Each of the image features identified and included in the generated image for the user prompt thus match at least one aspect of the user prompt (e.g., keywords, sequence of keywords, context, style, etc.).

To ensure that the AI model 320a generates the correct image for the user prompt, the ML engine 320 can assign a relative weight to each keyword, sequence of keywords, context identified for the user prompt (e.g., prompt 1) and style specified by the user. The relative weight assigned for the keywords, sequence of keywords, context and style are used to determine the relevance of each aspect of the user prompt to the user's intent as expressed in the user prompt. Based on the relative weights specifying the expressed intent of the user, the image generation AI model 320a generates the image with image features that are identified based on a level of influence of each keyword, keyword sequence, context, style, etc., of the user prompt. The generated image for the user prompt (i.e., prompt 1) is returned to client device 100 for rendering, in response to receiving prompt 1 from the user.

The user can accept the generated image for the user prompt by not providing any additional input, as shown by bubble 1 in FIG. 1, or can provide additional input to adjust the user prompt, as shown by bubble 2 in FIG. 1, and/or adjust certain image features of the generated image, as shown by bubble 3 in FIG. 1. In the case where no additional input has been provided by the user (i.e., following the path represented by bubble 1 in FIG. 1), the generated image for prompt 1 is forwarded to an image normalizing module 330 to verify the integrity of the generated image prior to forwarding the generated image to the client device 100 of user for rendering, in response to the user prompt (i.e., prompt 1). The image normalizing module 330 is configured to examine each of the image features included in the generated image and to verify that each of the image features are devoid of any visual anomalies. If any visual anomaly is detected at a particular image feature, the image normalizing module 330 identifies and applies an appropriate filter to correct the visual anomaly of the particular image feature that makes up the generated image, so that the generated image is normalized (i.e., devoid of visual anomalies). For example, if the generated image was generated to include an image of a man having 3 arms, or a body part (e.g., leg, hand or head) of the man in the image is misplaced or incorrectly oriented, appropriate filter is applied to adjust the image of the man to correct the anomaly, so that the generated image is without the visual anomalies. In the above example of the image of the man having 3 arms, the filter may be applied to obscure the $3^{rd}$ arm. The normalized generated image that is a visual representation of the user prompt is then returned to the display screen of the client device 100 for rendering.

In some implementations, the user can provide additional input to adjust prompt 1, as illustrated in bubble 2 of FIG. 1. The additional inputs can be provided by the user to adjust the keywords, the sequence of keywords, which can adjust the context of the user prompt, so that user prompt, prompt 1, reflects the intentions of the user. Additionally, where the style has not yet been provided by the user, the additional inputs provided by the user can specify the style for which the user prompt is being provided. The analysis module 310 uses the additional inputs to adjust prompt 1 so that the ML engine 320 with the aid of the AI model 320a can generate the appropriate image to provide a visual representation of the user prompt, prompt 1.

Figure 2:
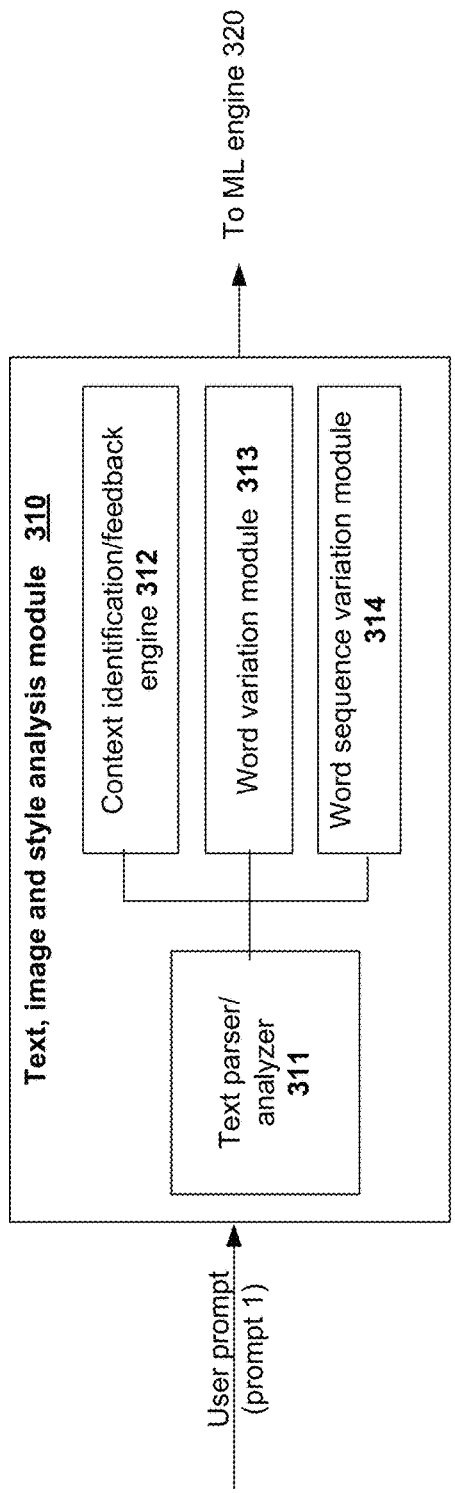
FIG. 2 illustrates a simplified block diagram of various components of a text and style analysis module used to analyze the user prompt to generate a generated image, in accordance with one implementation.

FIG. 2 illustrates some of the components of the analysis module 310 that is used to process the user prompt (i.e., initial user prompt (prompt 1)) as well as the additional inputs (e.g., prompt 2) to adjust the initial user prompt, prompt 1. Referring simultaneously to FIG. 1 and FIG. 2, the analysis module 310 includes a text parser/analyzer 311, a context identification/feedback engine 312, a word variation module 313, and a word sequence variation module 314. The text parser/analyzer 311 is configured to parse text input provided in the initial prompt (prompt 1) to identify keywords and sequence of keywords used in prompt 1. The identified keywords and sequence of keywords are forwarded by the text parser/analyzer 311 to the context identification/feedback engine 312 to determine the context of prompt 1. The context identification/feedback engine 312 determines the context based on the choice of the keywords/keyword sequences used. The keywords identified in prompt 1 are forwarded by the text parser/analyzer 311 to the word variation module 313 and the keyword sequences identified in prompt 1 are forwarded to the word sequence variation module 314 for further processing.

The word variation module 313 is configured to use the keywords identified in prompt 1 to identify and provide keyword variations for one or more of the keywords identified in prompt 1, for user selection. When providing the keyword variations for the different keywords, the word variation module 313 takes into consideration the style defined by the user and, in some cases, the context of prompt 1. The user can choose to select any one of the keyword variations presented for a particular keyword or not. If the user selects one of the keyword variations for the particular keyword, then that keyword variation is used to replace the particular keyword in prompt 1 to generate an adjusted prompt 1. The keyword variation used can change the context of prompt 1. To determine the adjusted context, the keyword variation for a particular keyword selected by the user is forwarded to the context identification/feedback engine 312, which parses the adjusted prompt 1 that includes the keyword variation to determine the current context of the adjusted prompt 1.

The word sequence variation module 314 identifies and presents one or more sequence variations for each of the keyword sequences identified in prompt 1. In the case where prompt 1 was adjusted to include keyword variations, the word sequence variation module 314 will use the adjusted prompt 1 to identify the keyword sequences and to identify and present sequence variations for a particular keyword sequence identified in the adjusted prompt 1 for user selection. When the user selects a sequence variation for the particular keyword sequence, the adjusted prompt 1 is updated by replacing the particular keyword sequence with the identified sequence variation. The updated prompt 1 with the sequence variation is also forwarded to the context identification/feedback engine 312, which then parses the keywords, keyword sequences and determines the current context of the adjusted prompt 1. The current context can remain the same as the original context or can have changed due to change in the keyword(s) and/or keyword sequence(s). The current context and the adjusted prompt 1 with the keywords and keyword sequences are forwarded to the ML engine 320 for generating an image that provides a visual representation of the adjusted prompt 1.

The ML engine 320 obtains the current context, and uses the keywords and keyword sequences of the adjusted prompt 1, to re-calculate the relative weight assigned to the different aspects of the adjusted prompt 1 (e.g., keywords, keyword sequences, context, style, etc.). The re-calculated relative weights will provide a better understanding of the intent of the user for the adjusted prompt 1. In some implementations, the weight assigned to the keyword variation in the adjusted prompt 1 can be of greater value than the weight assigned to the corresponding original keyword of prompt 1 to indicate that the particular keyword/keyword sequence is to be emphasized more in the adjusted prompt 1, due to the user's desire to replace the keyword/keyword sequence with the appropriate variation. Alternately, the weight assigned to a keyword variation/keyword sequence variation of the adjusted prompt 1 can be the same as the corresponding keyword and keyword sequence of the original prompt 1. The ML engine 320 can engage a weight assignment module (not shown) to initially assign relative weights to the keywords, keyword sequences identified in prompt 1 and to re-calculate the weights for the keywords, keyword sequences identified in the adjusted prompt 1. The relative weight of the various components of the prompt 1 and the adjusted prompt 1 are used by the AI model 320a to generate the image with image features that are influenced by the content (i.e., keyword, keyword sequence, context, style) included/specified in the adjusted prompt 1. The image thus generated by the AI model 320a is contextually relevant and is an appropriate visual representation of the user prompt. In some implementations, the ML engine 320 with the aid of the AI model 320a will generate individual images to separately represent the original prompt 1 and the adjusted prompt 1. The generated images are processed by the image normalizing module 330 to remove (i.e., filter out) any visual anomalies prior to forwarding the generated images to the client device for rendering, in response to the user prompt.

It should be noted that the analysis module 310, the ML engine 320 with the AI model 320a, and the normalizing module 330 processes the user prompt on-the-fly to generate an image and normalize the generated image in real-time. As the user provides additional input, the generated image is refined in accordance to the additional input, which can include variations to the keyword/keyword sequence and additional inputs to further clarify the user prompt. The dynamic adjustment to the generated image and normalizing of the adjusted generated image continues so long as the user provides additional input for the user prompt. Once the user has completed providing their input to adjust the user prompt, the resulting normalized generated image is forwarded to the client device 100 for rendering.

After returning the normalized generated image to the client device for the adjusted user prompt, the ML engine 320 keeps track of the user input at the user interface to determine if the user wishes to perform a new search or wishes to fine tune the generated image that was returned to the client device for rendering, in response to the user prompt (prompt 1). The user can accept the generated image returned to the client device as-is, or may wish to tune certain feature(s) of the generated image. If the user wishes to tune the generated image, the user can identify a particular image feature included in the generated image and provide instructions to adjust the particular image feature. The system will follow the path illustrated by bubble 3 in FIG. 1.

As noted, the generated image includes image features that are influenced by content (e.g., keyword, keyword sequence, context, style, source image, etc.) provided in the user prompt. When the user wishes to fine tune a portion of the generated image, the user can use the generated image to identify a particular image feature that corresponds with the portion of the generated image the user wishes to fine tune. In addition to identifying the particular image feature, the user may also provide instructions detailing how the particular image feature has to be tuned. In some implementations, the instructions can include inclusivity clause or exclusivity clause. For instance, with the inclusivity clause, the user can instruct the system to add more of a certain feature (e.g., clump of trees) to the generated image. For example, the user can identify a clump of trees (i.e., particular image feature) that is already there in the generated image and request that more of such clumps of trees should be added to the generated image. Further, the user could point out a portion of the generated image where they would like the additional clump of trees needs to be added. In another example, the user can identify a particular image feature in the generated image and provide instructions to change the color or look or position of the particular image feature. The instructions represent the tuning comments that can be used to tune the particular image feature of the generated image. In addition to the generated image, the user can also upload a source image (either user-generated or retrieved from a content provider's website) that includes a different representation of the image feature that the user would like to incorporate in the particular image feature of the generated image. In some implementations, the tuning comments are provided as text inputs in a text field at the user interface. In alternate implementations, the tuning comments are provided as annotations over the image feature of the generated image that the user has selected for fine tuning. The tuning comments along with the generated image identifying the particular image feature that needs to be tuned, and any source image having a different representation of the particular image feature are forwarded to the analysis module 310 for processing.

The analysis module 310 parses and identifies keywords, keyword sequences, context, etc., included in the tuning comments. The analysis module 310 also parses the generated image and the source image and identifies attributes of the particular image feature included within. The details obtained from parsing the tuning comments and the particular image feature of the generated image and the source image are forwarded to the ML engine 320. The ML engine 320 uses the tuning comments and attributes associated with the corresponding image feature identified in the source image to tune the particular image feature of the generated image. The tuning is done in accordance to the tuning comments to generate an adjusted image for the generated image. The adjusted image includes changes to the particular image feature, wherein the changes are influenced by the tuning comments. The particular image feature included in the adjusted image exhibits the style that corresponds with the style of the image feature shown in the source image.

In alternate implementations, the tuning comments can include exclusivity clause, such as remove any representation of a certain image feature identified in the source image from a particular portion of the generated image. The tuning of a particular image feature of the generated image is thus performed to include or exclude certain image feature identified in the source image and/or specified in the tuning comments provided by the user so that the resulting adjusted image includes image features that exhibit attributes that are in accordance to the user's inputs.

Figure 3:
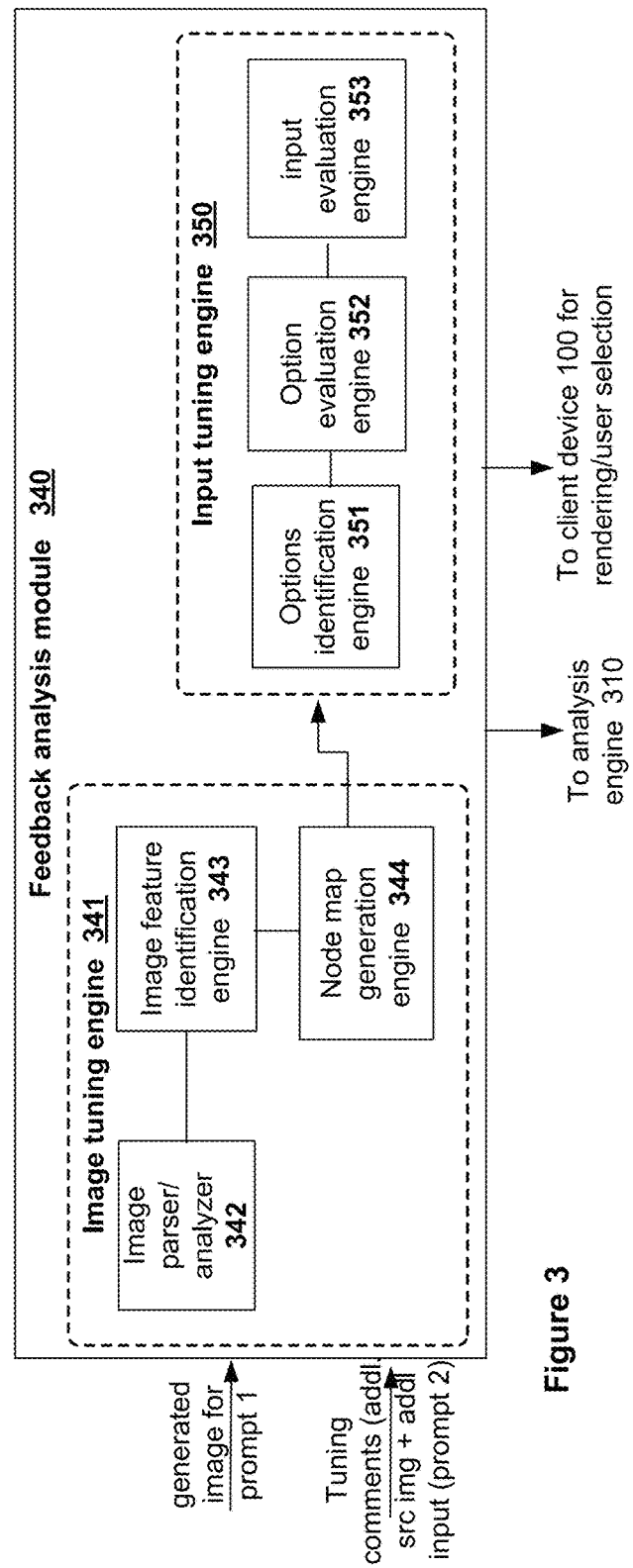
FIG. 3 illustrates a simplified block diagram of various components of a feedback analysis module used to fine-tune the generated image generated for the user prompt, in accordance with one implementation.

FIG. 3 illustrates the various modules included in the feedback analysis engine 340 to receive and process the feedback received from the user for tuning the generated image. As the feedback is received to fine tune certain image features of an image generated for the user prompt (prompt 1), the feedback (i.e., prompt 2) is also referred to henceforth as "tuning comments". The tuning comments can include just the text input, or both the text input and the image input. Referring simultaneously to FIGS. 1 and 3, the feedback engine 340 includes an image tuning engine 341 and an input tuning engine 350. The image tuning engine 341 can include components, such as an image parser/analyzer 342, an image feature identification engine 343, and a node map generation engine 344. The input tuning engine 350 can include components, such as options identification engine 351, option evaluation engine 352, and input evaluation engine 353. The aforementioned components are provided as mere examples and should not be considered exhaustive and that fewer or additional components can be included within the feedback analysis module 340. For instance, functions of the image parser/analyzer 341, image feature identification engine 342 and node map generation engine 343 can all be performed by the image tuning engine 341 within the feedback analysis module 340. Similarly, the functions of the options identification engine 351, option evaluation engine 352 and input evaluation engine 353 can all be performed by the input tuning engine 350.

The feedback analysis module 340 begins processing the tuning comments (i.e., prompt 2) by first parsing the tuning comments to identify the content included within. As noted before, the tuning comments can include text input, or both the text input and image input. The image input can be a user-generated image or a source image retrieved from an image source, such as a content provider or a content distributor that is uploaded by the user. When the tuning comments include a source image, an image parser/analyzer 341 is used to parse the source image to identify the type of source image uploaded. In some implementations, the source image type is determined by the purpose for which the source image is being uploaded. In alternate implementations, the type associated with the source image is determined by identifying the type of generated image for which the tuning comments are being provided, wherein the type is defined based on a type of use envisioned for the generated image (i.e., purpose of the generated image). For example, the generated image can be generated as a virtual art object, a virtual poster, a virtual logo for use in a wearable object or to represent an event or company, or a virtual character/virtual object for use in an interactive application, such as a video game, etc. Although the components of the feedback analysis module 340 is described with reference to processing the generated image, the feedback analysis module 340 is also used to process the source image that is included in the tuning comments in a similar manner to how the generated image is being processed.

An image feature identification engine (or simply referred to henceforth as "feature identification engine") 343 is engaged by the feedback analysis module 340 to identify the various image features included in the generated image and the particular image feature that has been identified for tuning. The generated image includes a plurality of image features. Each image feature included in the generated image represents a particular portion of content (e.g., keyword, keyword sequence, context, etc.) of the user prompt or is an image feature that is included by the AI model 320*a*. The user could identify the image feature for tuning by annotating the image feature directly on the generated image or via text input (i.e., tuning comments) or using a node map. Use of the node map to identify the image feature selected for tuning will be described in more detail below. The image feature identification engine identifies the particular image feature selected for tuning and analyzes the attributes of the particular image feature, wherein the particular image feature can correspond to content of the user prompt or can be a feature that was included in the generated image by the AI model 320*a*.

In some implementations, a node map generation engine is used to identify the various image features that are included in the generated image and use the identified image features to generate a node map for the generated image. As noted, the image features identified in the generated map can relate to or not relate to content of the user prompt. The node map is generated to include a plurality of nodes, wherein each node corresponds to an image feature identified in the generated map. In some implementations, depending on the type of generated image, the node map of the generated image can include a hierarchy of interconnected nodes (i.e., spanning multiple layers) or have certain ones of the nodes that are interconnected to represent inter-relationship of the corresponding image features represented by the nodes, and certain other ones of the nodes that are independent. For example, an image of a dog can be associated with a node map where the dog can be the main node with sub-nodes defining the face, body, legs, and tail of the dog that are inter-connected with one another (e.g., face, legs and tail connected to the body of the dog) and with the dog node at the immediately higher level, and additional nodes corresponding to the style preference (e.g., breed of the dog) of the user, a color of the dog, etc., are represented as independent nodes. Although some of the nodes are represented as independent nodes, any adjustments to these independent nodes can affect the overall look of the dog. For example, changing the breed or the color can affect the overall look of the image of the dog in the generated image. The generated node map with the hierarchical nesting of nodes is forwarded to the client device for rendering at a tuning interface defined within a user interface as tuning options for user selection. Details of the tuning comments and tuning options will be discussed in more detail with reference to FIGS. 4A-4C.

User can traverse the node map rendered at the tuning interface and select a particular node that corresponds to the particular image feature of the generated image to fine tune. The user then provides tuning comments to tune the particular image feature. The tuning comments can be in the form of text input entered via a text input field, or by selecting one of a plurality of pre-defined text options identified for the particular image feature, or by annotating directly on the selected image feature at the generated image. The pre-defined text options, for example, can be provided based on a type of the generated image. For instance, the user may be trying to design an art work using the generated image. Thus, when the user wishes to fine tune a particular image feature of the generated image, the user can traverse the node map and select a node that corresponds with the particular image feature (e.g., a background of the generated image). User selection of the node corresponding to the background of the generated image is forwarded to an input tuning engine 350, along with the generated image.

The input tuning engine 350 determines that the generated image is being designed as an art work and the particular image feature selected by the user within the source image is the background that they want to fine tune. Based on this information, the input tuning engine 350 can engage an options identification engine 351 to check and retrieve any pre-defined options defined for the background that is usable for the art work of the generated image, and presents the pre-defined options at the tuning interface as user selectable options. In the above example, the pre-defined options presented at the tuning interface for user selection can include the different art periods (e.g., ancient, classical Greek/Roman, Medieval, Renaissance, Baroque, etc.). In some implementations, instead of specifying the art periods, background images representing the different art periods can be provided as thumbnails for user selection. User selection of an option (either pre-defined text option or thumbnail option) at the tuning interface is used to dynamically adjust the background of the generated image uploaded to the input interface.

In alternate implementations, instead of providing a set of pre-defined options to select from, the user interface can allow the user to specify the art period in the text input field provided at the user interface for use to tune the background of the generated image. Responsive to receive the user input (i.e., tuning comments) at the text input field, an options evaluation engine 352 is engaged to verify the specified art period and to identify and retrieve one or more backgrounds that match the specified art period for adjusting the background of the generated image to generate the adjusted image.

In addition to providing a text field to enter tuning comments and providing pre-selected options to select from, the user interface allows the user to upload a source image and provide tuning comments for tuning the particular image feature of the generated image. The tuning comments include descriptive language with sufficient details on how the particular image feature of the generated image is to be adjusted. An input evaluation engine 353 is engaged by the input tuning engine 350 to evaluate the descriptive language included in the tuning comments. The tuning comments can indicate that the particular image feature of the generated image is to be tuned so as to adopt the style of a corresponding image feature identified in the source image. For example, the tuning comments would instruct the AI model to use the color of the sky in the source image to influence a change in the color of the sky in the generated image so that the particular image feature in the adjusted image resulting from tuning would exhibit the style of the source image. As noted before, the instructions can use either inclusivity clause or exclusivity clause. The input evaluation engine 353 determines the type of clause included in the instructions and the type and an extent of change that is specified in the tuning comments to tune the generated image accordingly. For example, the user can identify a clump of pine trees that are depicted in the background of the generated image and provide tuning comments that specifies that the identified clump of pine trees should be replaced by redwood trees. Additionally, the tuning comments can also include instructions for adding more (i.e., extent, such as 2 sets or 3 sets) of such clump of redwood trees in the portion of the background identified in the generated image. Alternately, the user can include instructions to remove such clump of trees from the portion of the background of the generated image. The input evaluation engine 353 identifies such clauses included in the tuning comments and uses the clauses to take appropriate action in a portion (i.e., corresponding to the identified image feature) of the generated image. The resulting adjusted image can be returned to the analysis module 310 when additional input is provided at the user prompt so that the adjusted image can be updated in accordance to the additional input. Alternately, the adjusted image resulting from the tuning of the generated image is returned to the client device for rendering, in response to the user prompt.

The generated image rendered at the client device is a customized visual representation of the user prompt (prompt 1) that has been fine-tuned in accordance to the user's specification. The analysis module 310 provides control to the user to fine tune their user prompt so that the image generated is in accordance to the user prompt and provides a visual representation of the user's intent, and the feedback analysis module provides the user greater control in fine-tuning the different image features of the generated image so that the resulting generated image is a customized visual representation of the user prompt.

Figure 4A:
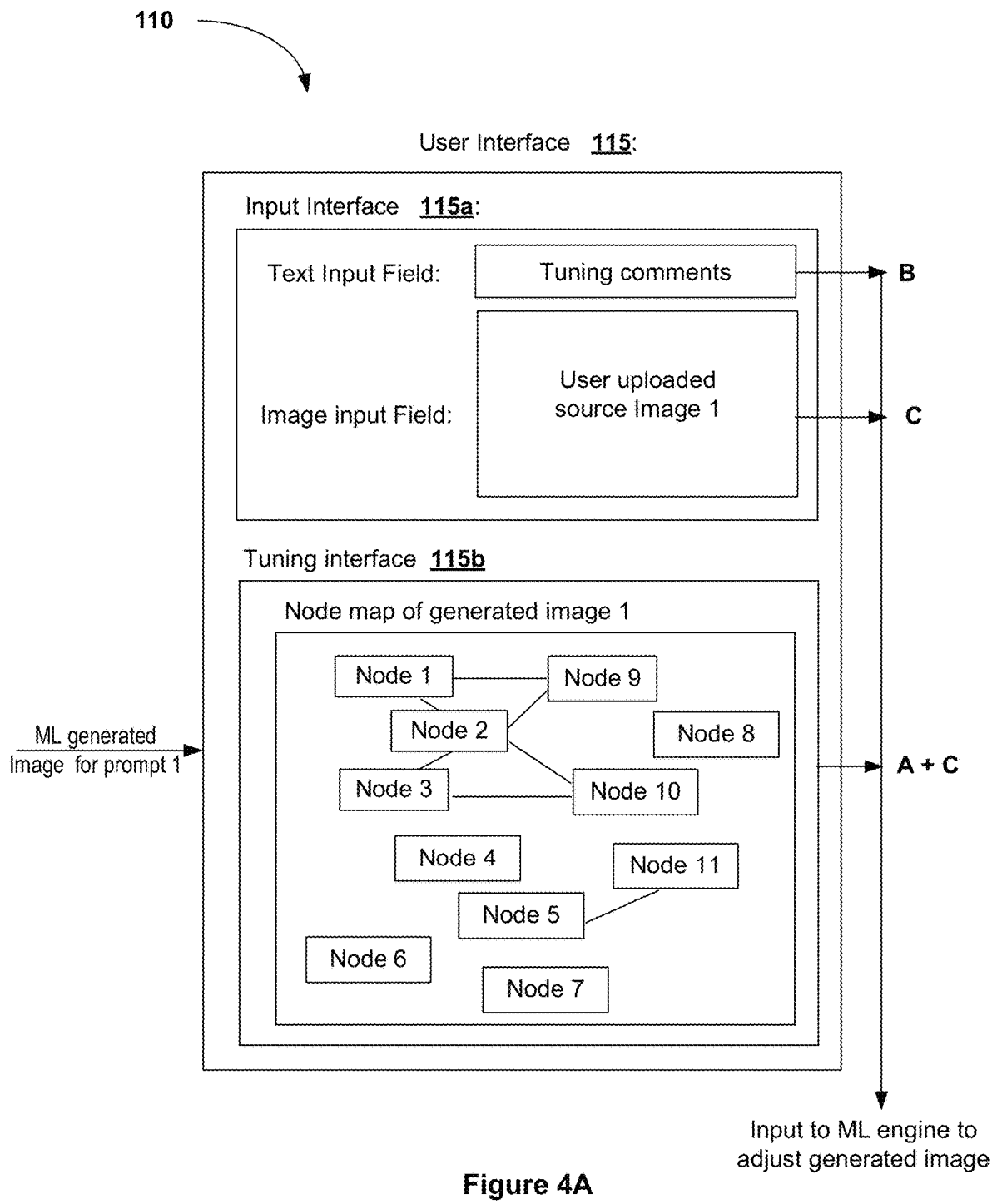
FIG. 4A illustrates a sample user interface with an input interface used for providing an initial user prompt, uploading image(s) and providing additional feedback for generating and adjusting a generated image, and a tuning interface for illustrating a node map of the generated image for selecting a particular node for fine-tuning, in accordance with one implementation.

FIG. 4A illustrates a user interface 115 that is used by the analysis module 310 and the feedback analysis module 340 to present the various options available to the user and to allow the user to provide inputs, upload source images and provide tuning comments to tune the image generated for the user prompt. The user interface 115 rendered at a display screen 110 of a client device 100 includes multiple portions for receiving different inputs from the user. For example, the user interface 115 includes a first portion representing an input interface 115*a* and a second portion representing a tuning interface 115*b*. The input interface 115*a* is provided to allow the user to provide both text input/text prompt and image input/image prompt. The text input can include both the initial user prompt (i.e., prompt 1) as well as tuning comments (i.e., prompt 2). Similarly, the image input can include a source image provided as part of the initial user prompt (prompt 1) as well as part of the tuning comments (prompt 2). The tuning interface 115*b* is used to render the node map of the generated image, for example, to allow the user to select a node of the generated image that they would like to tune. The tuning interface 115*b* is also configured to render a node map of a source image that is uploaded as part of the tuning comments to allow the user to select a node of the source image corresponding to an image feature of the generated image that is selected for fine tuning. The node map provides the user with greater flexibility of viewing the overall image features available for tuning and the relationship between the different image features as shown by the interconnectivity of nodes in the node map, so that the user can have an understanding of how a change in one image feature can affect another image feature of the generated image, when requesting to fine-tune a specific image feature.

Figure 4B:
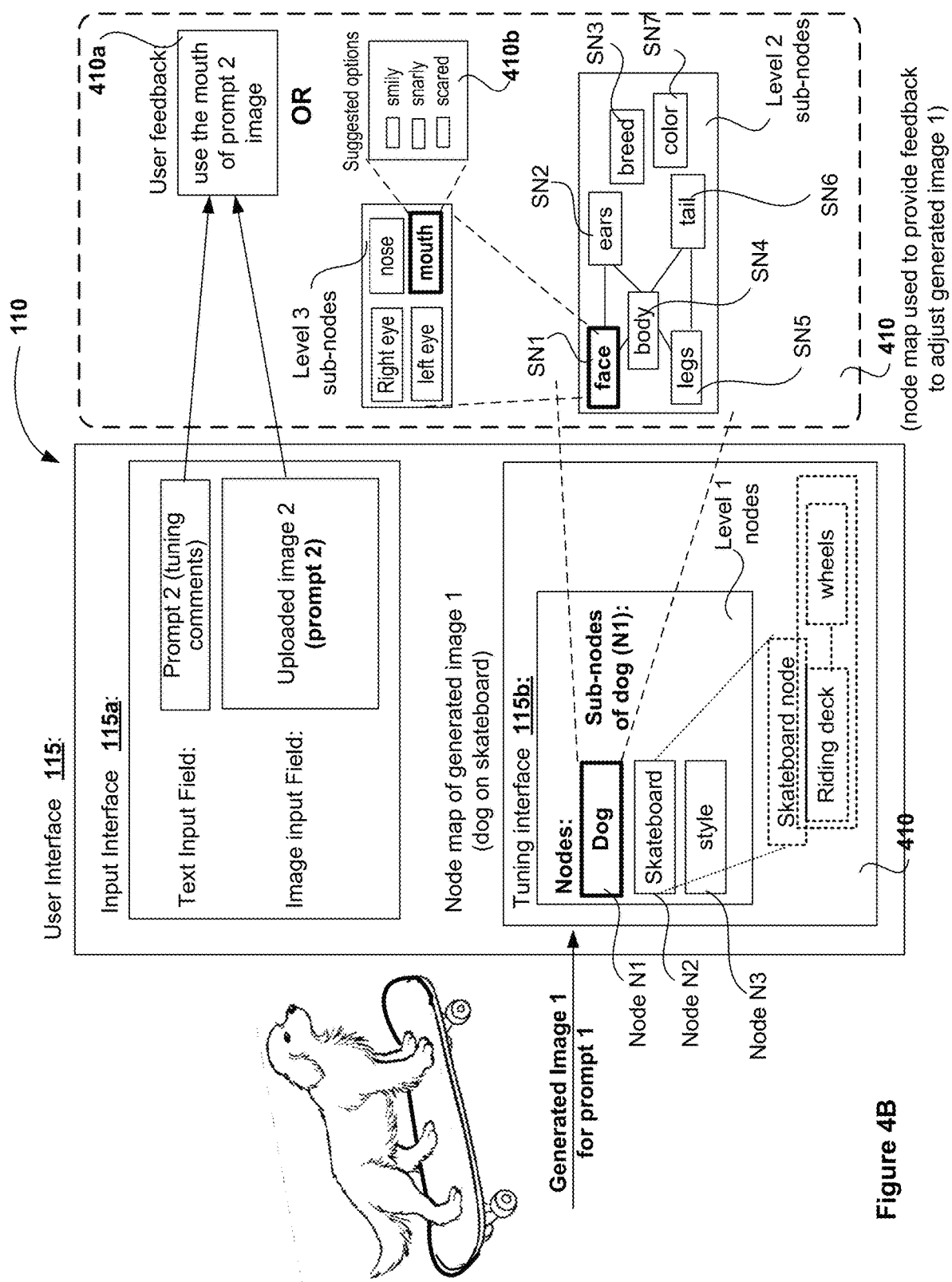
FIG. 4B illustrate an example user interface used for providing feedback to fine tune a particular node of the generated image, in accordance with one implementation.

FIG. 4B illustrates a sample user interface 115 identifying the various fields and options that are available for fine tuning an image feature of a generated image. The generated image may be for an initial user prompt, "dog on a skateboard". The user interface 115 rendered at a display screen of the client device 100 allows the user to provide the generated image for fine tuning. The generated image is uploaded at the user interface 115 automatically via the image input field when the user selects the generated image for fine tuning a certain image feature. Tuning comments from the user are received at the text input field and the image input field, when the tuning comments includes a source image for use in fine tuning an image feature of the generated image. It should be noted that the image input field is used to upload both the generated image for fine tuning an image feature, as well as a source image that provides details of a corresponding image feature that is to be used to fine tune the image feature of the generated image. A node map generated for the generated image is rendered at the tuning interface. The node map is generated by analyzing the generated image to identify the image features and to present the identified image features using nodes. Depending on the type of the generated image, the node map can have a single level of nodes or multiple levels of nodes. In the example of the generated image for the user prompt, "dog on a skateboard", the node map that is generated is a multi-level node map and includes node 1 (N1) representing the dog, node N2 representing the skateboard, and node N3 representing a style associated with the generated image at the first level. When the user selects the dog node N1 (i.e., top-level node), as shown by the highlighted rectangle, second level of sub-nodes (i.e., sub-nodes under node N1) are dynamically identified and presented at the tuning interface for user selection. Thus, for the dog node, N1, sub-node 1 (SN1) representing the face, SN2 representing ears, SN3 representing breed, SN4 representing body, SN5 representing legs, SN6 representing tail, and SN7 representing color are identified and presented. The user can further drill down to the next level (i.e., level 3 sub-nodes) of the dog node by selecting face sub-node (SN1) as shown by the highlighted rectangle and the tuning interface 115*b* will dynamically identify and render the sub-nodes associated with the face sub-node (SN1). Thus, the face sub-node can include the following sub-nodes—eyes (right eye, left eye), nose, and mouth. The user can select the mouth sub-node (as shown by the highlighted rectangle), and, in some implementations, the tuning interface is dynamically updated to include pre-defined suggested options pertaining to the expressions that can be rendered by adjusting the shape of the mouth of the dog, as shown by different selectable options (e.g., smiley, snarly, or scared) in box 410*b*. The selectable options are pre-defined based on the sub-node selected. The user can select any one of the options, and the user selection is used by the feedback analysis engine to adjust (i.e., fine-tune) the shape of the mouth of the dog in the generated image to exhibit the selected expression. In alternate implementations, the user feedback (i.e., prompt 2) can be provided at the text input field as well as the image input field, which are then used to adjust the mouth feature of the dog, as illustrated in box 410*a*.

The node map allows the user to quickly and precisely select the image feature of the generated image for fine tuning and the user interface provides the necessary tools and options for the user to specify sufficient details for fine-tuning the selected image feature of the generated image making this a very user-friendly and robust tool for generating customized generated image for the user. It should be noted that the additional source image provided by the user to fine-tune the generated image can be a user-generated image or obtained from a content provider. Alternately, the user can provide a uniform resource locator (URL) link where the user selected image(s) is stored and can be retrieved. A customized text-to-image generation tool generates an image for a prompt provided by the user and allows the user to use the generated image to fine tune certain image features so as to customize the generated image in accordance to the style specified by the user.

Figures 1, 4C:
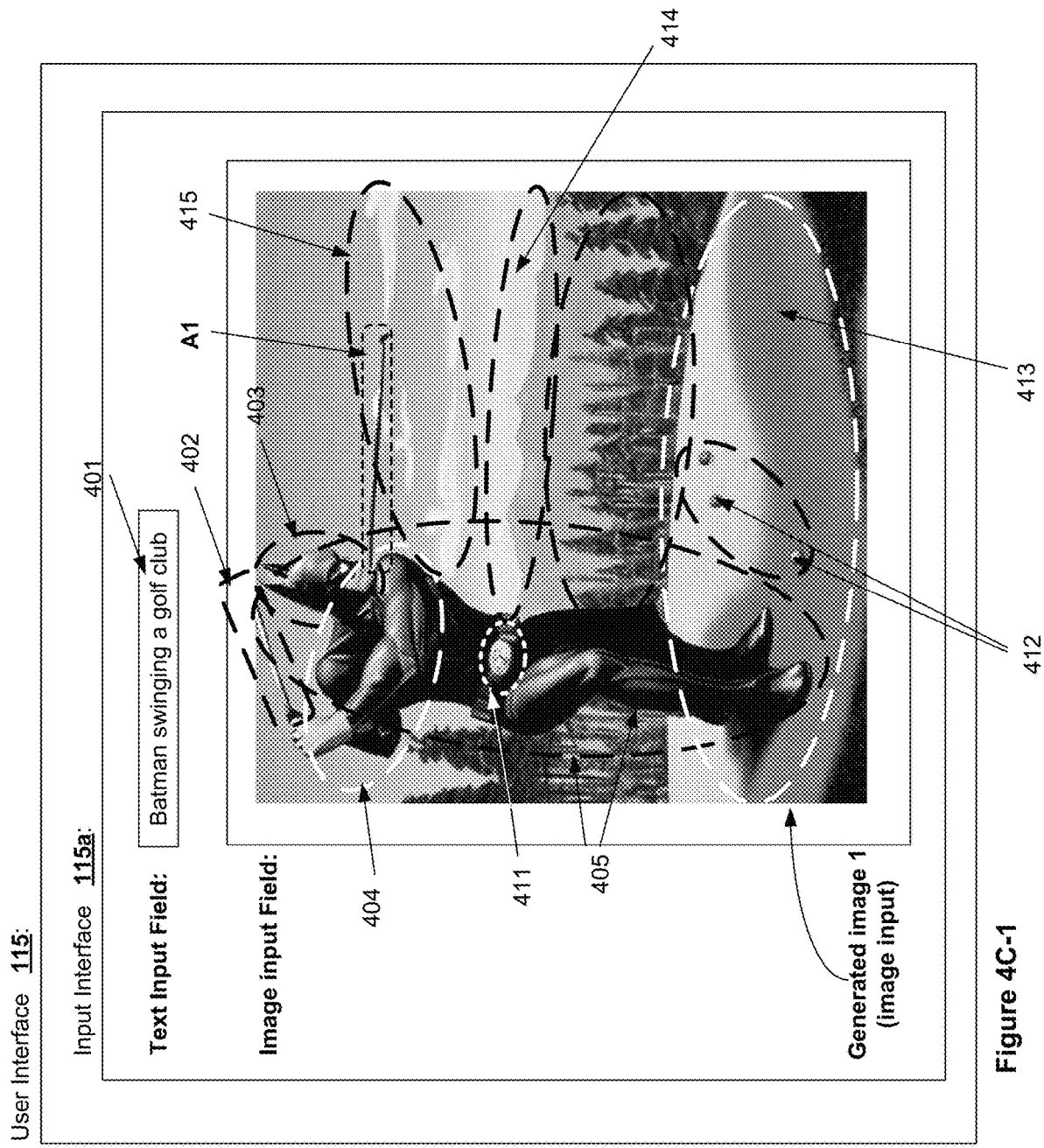
Figures 2, 4C:
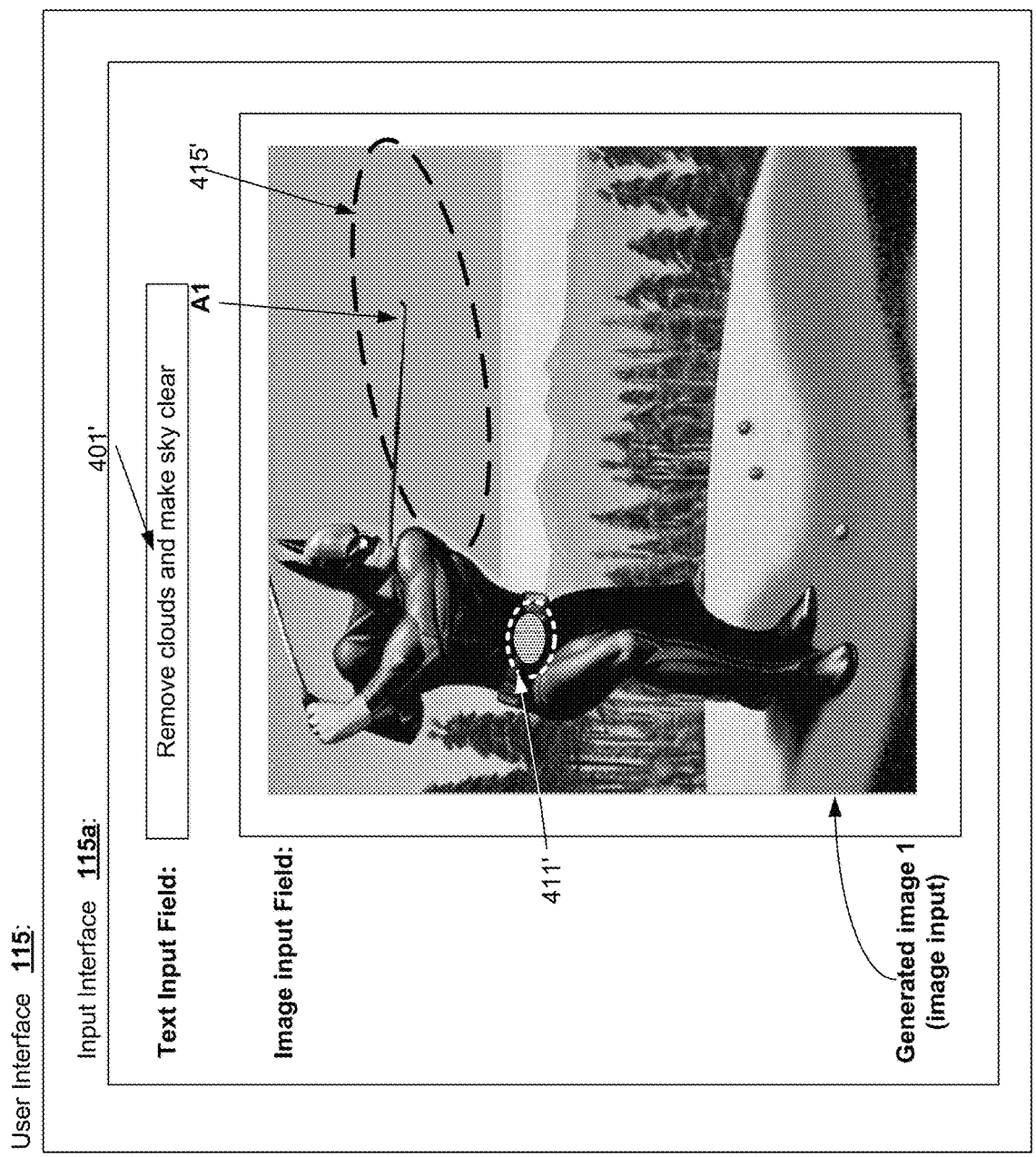

FIGS. 4C-1 and 4C-2 illustrate an example of a generated image that is fine tuned using tuning comments, in one implementation. Referring to FIG. 4C-1, an image is generated for an initial user prompt, "batman swinging a golf club" 401 provided at the text input field of the input interface 115*a* of the user interface 115. The user may wish to fine tune certain image features of the generated image of the batman playing golf. Based on the request to fine tune the generated batman image, the generated batman image is uploaded to the image input field. The generated image is analyzed to identify the various image features. In the batman image, the image features that are identified include image features that are influenced by content of the user prompt and image features that are included by the AI model. For example, some of the image features influenced by content of the user prompt and identified in the batman image include golf club 402, the batman face 403, the arm swinging 404, the batman costume 405. In addition to the image features influenced by the content of the user prompt, additional image features, such as the belt 411, the golf balls 412, the driving range (i.e., the putting green) 413, the silhouette of a mountain range 414, the sky including clouds 415 are also included in the batman image. In addition to the above identified image features, the batman image can include an anomaly 'A1' of a golf club extending from the shoulder of the batman. The user can provide tuning comments to adjust one or more image features of the batman image.

FIG. 4C-2 illustrates one such example tuning that is done based on tuning comments provided by the user, in one implementation. To get a general understanding of how the tuning comments are used to tune some of the image features of the generated image, a simple example is used. It should be understood that the tuning comments can include more complex directions for tuning and can also include tuning comments for tuning more than one image feature at a time. In the example illustrated in FIG. 4C-2, the tuning comments are provided as text input in the text input field. When the user enters the tuning comments 401', "Remove clouds and make sky clear", in the text field, the feedback analysis module 340 uses the tuning comments to identify the sky as the image feature the user wishes to fine tune in the generated image and uses the tuning comments to remove all the clouds in the sky (415') of the generated image to generate the adjusted image. The adjusted image can be further tuned by identifying additional image features and the process of tuning the adjusted image continues so long as the user provides the tuning comments. In the example illustrated in FIG. 4C-2, the belt of the batman (i.e., additional image feature) was adjusted to exhibit a different style (represented as 411'), wherein the different style could be specified using another image or using tuning comments provided via text input at the text field. Once the tuning is completed, the adjusted image is processed by an image normalizing module 330 to remove any visual anomalies, such as A1 shown in FIGS. 4C-1 and 4C-2. The resulting adjusted and normalized image can be used by the user for the purpose that they generated the user prompt.

Figure 5:
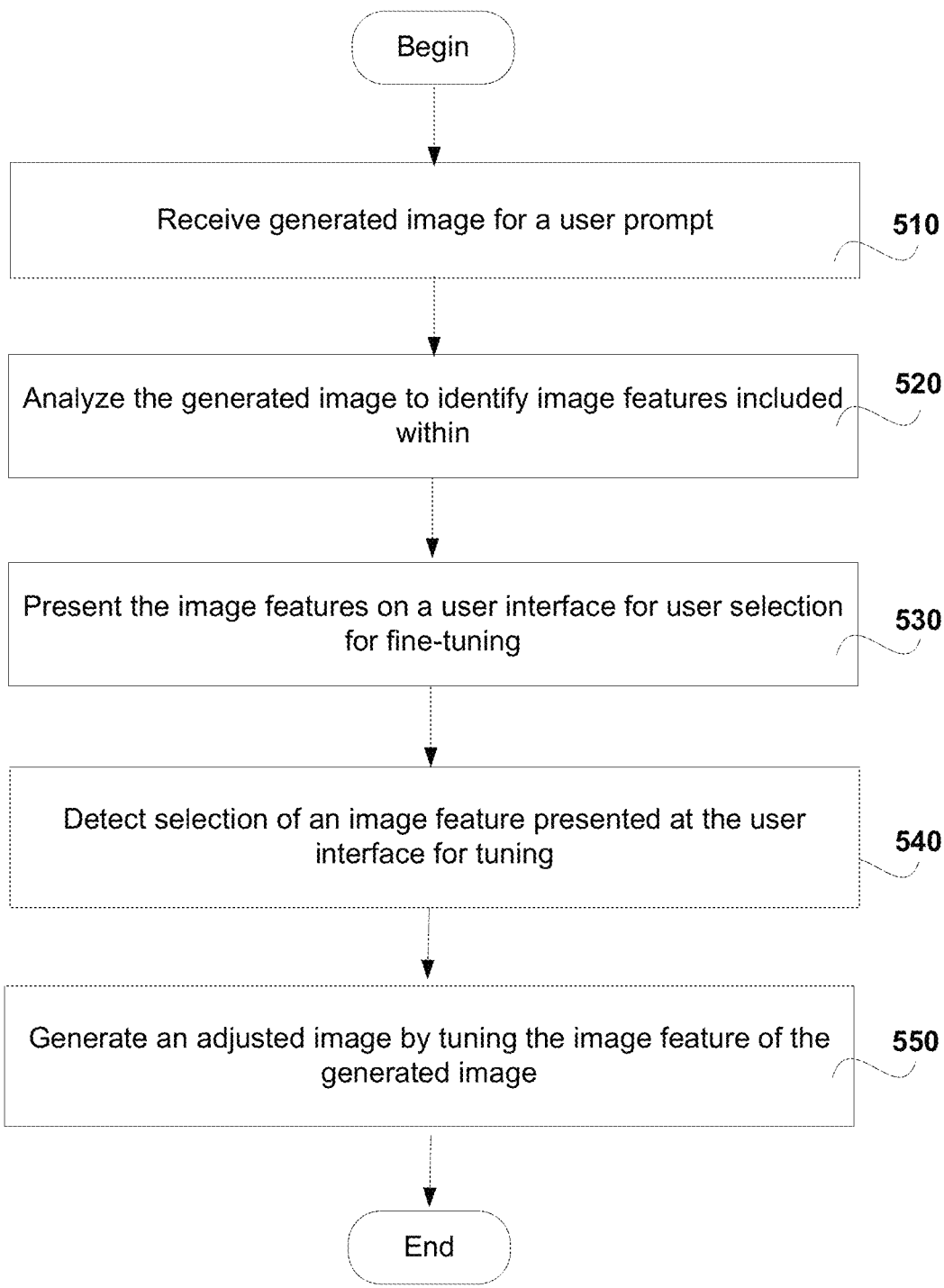
FIG. 5 illustrates flow of operations of a method for fine-tuning a generated image generated for a user prompt, in accordance with one implementation.

FIG. 5 illustrates flow of operations of a method used for tuning an image generated by an image generation artificial intelligence (IGAI) process, in one implementation. The method begins at operation 510 wherein a generated image is received for a user prompt. The generated image includes image features that are influenced by content provided in the user prompt, wherein the content can include keywords, keyword sequences, context, style, etc. The generated image is a visual representation of the user prompt. The generated image is analyzed to identify images features that are included within, as illustrated in operation 520. The generated image can include both content related and non-content related image features. Depending on the type of image generated for the user prompt (e.g., 2-dimensional, 3-dimensional, etc.), the image features can be identified at different levels. The image features identified from the generated image are presented on a user interface of a client device of the user for user selection for fine-tuning, as illustrated in operation 530.

User selection of a particular image feature presented at the user interface is detected, as illustrated in operation 540. The user selection includes tuning comments from the user. The tuning comments can be in the form of text input and, in some cases, image input. The tuning comments are used to influence the IGAI process to steer the selected image feature of the generated image to adopt a style expressed in the tuning comment. For example, if the tuning comment includes an image input, then an image feature from the image input is identified in the tuning comment and the text input will provide the necessary instructions to the IGAI to adjust the corresponding image feature of the generated image to exhibit the style of the image feature of the image input. An adjusted image is generated by fine tuning the selected image feature of the generated image in accordance to the tuning comments, as illustrated in operation 550. The fine tuning includes changing one or more attributes of the selected image feature of the generated image so that the image feature will start exhibiting attributes that are in accordance to the tuning comments provided by the user. The adjusted image is returned to the client device for rendering, in response to receiving a request to tune the generated image from a user. The adjusted image with the finely tuned image feature represents a customized and contextually relevant visual representation of the user prompt of the user.

In one embodiment, the generation of an output image, graphics, and/or three-dimensional representation by an image generation AI (IGAI), can include one or more artificial intelligence processing engines and/or models. In general, an AI model is generated using training data from a data set. The data set selected for training can be custom curated for specific desired outputs and in some cases the training data set can include wide ranging generic data that can be consumed from a multitude of sources over the Internet. By way of example, an IGAI should have access to a vast of amount of data, e.g., images, videos and three-dimensional data. The generic data is used by the IGAI to gain understanding of the type of content desired by an input. For instance, if the input is requesting the generation of a tiger in the Sahara desert, the data set should have various images of tigers and deserts to access and draw upon during the processing of an output image. The curated data set, on the other hand, maybe be more specific to a type of content, e.g., video game related art, videos and other asset related content. Even more specifically, the curated data set could include images related to specific scenes of a game or actions sequences including game assets, e.g., unique avatar characters and the like. As described above, an IGAI can be customized to enable entry of unique descriptive language statements to set a style for the requested output images or content. The descriptive language statements can be text or other sensory input, e.g., inertial sensor data, input speed, emphasis statements, and other data that can be formed into an input request. The IGAI can also be provided images, videos, or sets of images to define the context of an input request. In one embodiment, the input can be text describing a desired output along with an image or images to convey the desired contextual scene being requested as the output.

In one embodiment, an IGAI is provided to enable text-to-image generation. Image generation is configured to implement latent diffusion processing, in a latent space, to synthesize the text to image processing. In one embodiment, a conditioning process assists in shaping the output toward the desired using output, e.g., using structured metadata. The structured metadata may include information gained from the user input to guide a machine learning model to denoise progressively in stages using cross attention until the processed denoising is decoded back to a pixel space. In the decoding stage, upscaling is applied to achieve an image, video, or 3D asset that is of higher quality. The IGAI is therefore a custom tool that is engineered to process specific types of input and to render specific types of outputs. When the IGAI is customized, the machine learning and deep learning algorithms are tuned to achieve specific custom outputs, e.g., such as unique image assets to be used in gaming technology, specific game titles, and/or movies, customized wearable or usable products (e.g., T-shirts or other wearable clothing).

In another configuration, the IGAI can be a third-party processor, e.g., such as one provided by Stable Diffusion or others, such as OpenAI's GLIDE, DALL-E, MidJourney or Imagen. In some configurations, the IGAI can be used online via one or more Application Programming Interface (API) calls. It should be understood that reference to available IGAI is only for informational reference. For additional information related to IGAI technology, reference may be made to a paper published by Ludwig Maximilian University of Munich titled "*High-Resolution Image Synthesis with Latent Diffusion Models*", by Robin Rombach, et al., pp. 1-45. This paper is incorporated by reference.

Figure 6A:
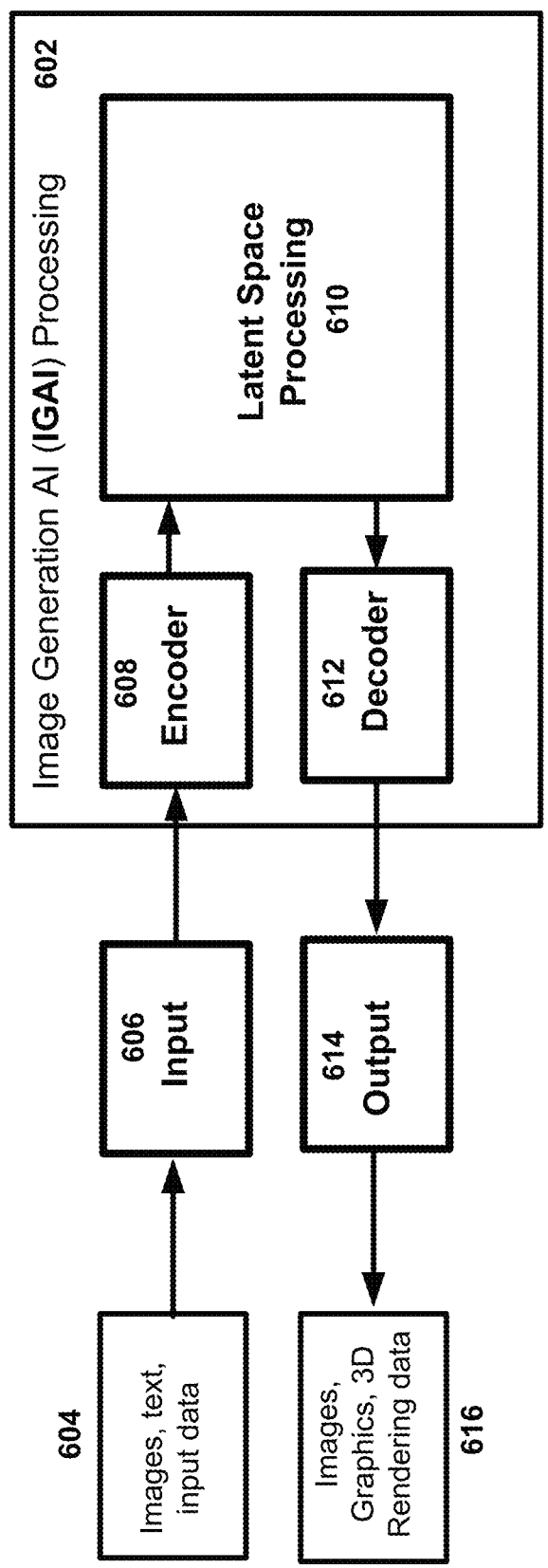
FIG. 6A illustrates an image generation AI processing sequence used to generate image for a user prompt (i.e., query), in accordance with one implementation.

FIG. 6A is a general representation of an image generation AI (IGAI) 602 processing sequence, in accordance with one embodiment. As shown, input 606 is configured to receive input in the form of data, e.g., text description having semantic description or keywords. The text description (i.e., text input) can in the form of a sentence, e.g., having at least a noun and a verb. The text description can also be in the form of a fragment or simply one word. The text can also be in the form of multiple sentences, which describe a scene or some action or some characteristic. In some configuration, the input text can also be input in a specific order so as to influence the focus on one word over others or even deemphasize words, letters or statements. Still further, the text input can be in any form, including characters, emojis, ions, foreign language characters (e.g., Japanese, Chinese, Korean, etc.). In one embodiment, text description is enabled by contrastive learning. The basic idea is to embed both an image and text in a latent space so that text corresponding to an image maps to the same area in the latent space as the image. This abstracts out the structure of what it means to be a dog for instance from both the visual and textual representation. In one embodiment, a goal of contrastive representation learning is to learn an embedding space in which similar sample pairs stay close to each other while dissimilar ones are far apart. Contrastive learning can be applied to both supervised and unsupervised settings. When working with unsupervised data, contrastive learning is one of the most powerful approaches in self-supervised learning.

In addition to text, the input can also include other content, e.g., such as images or even images that have descriptive content themselves. Images can be interpreted using image analysis to identify objects, colors, intent, characteristics, shades, textures, three-dimensional representations, depth data, and combinations thereof. Broadly speaking, the input 606 is configured to convey the intent of the user that wishes to utilize the IGAI to generate some digital content. In the context of game technology, the target content to be generated can be a game asset for use in a specific game scene. In such a scenario, the data set used to train the IGAI and input 606 can be used to customize the way artificial intelligence, e.g., deep neural networks, process the data to steer and tune the desired output image, data or three-dimensional digital asset.

The input 606 is then passed to the IGAI, where an encoder 608 takes input data and/or pixel space data and converts into latent space data. The concept of "latent space" is at the core of deep learning, since feature data is reduced to simplified data representations for the purpose of finding patterns and using the patterns. The latent space processing 610 is therefore executed on compressed data, which significantly reduces the processing overhead as compared to processing learning algorithms in the pixel space, which is much more data heavy and would require significantly more processing power and time to analyze and produce a desired image. The latent space is simply a representation of compressed data in which similar data points are closer together in space. In the latent space, the processing is configured to learn relationships between learned data points that a machine learning system has been able to derive from the information that it gets fed, e.g., the data set used to train the IGAI. In latent space processing 610, a diffusion process is computed using diffusion models. Latent diffusion models rely on autoencoders to learn lower-dimension representations of a pixel space. The latent representation is passed through the diffusion process to add noise at each step, e.g., multiple stages. Then, the output is fed into a denoising network based on a U-Net architecture that has cross-attention layers. A conditioning process is also applied to guide a machine learning model to remove noise and arrive at an image that represents closely to what was requested via user input. A decoder 612 then transforms a resulting output from the latent space back to the pixel space. The output 614 may then be processed to improve the resolution. The output 614 is then passed out as the result, which may be an image, graphics, 3D data, or data that can be rendered to a physical form or digital form.

Figure 6B:
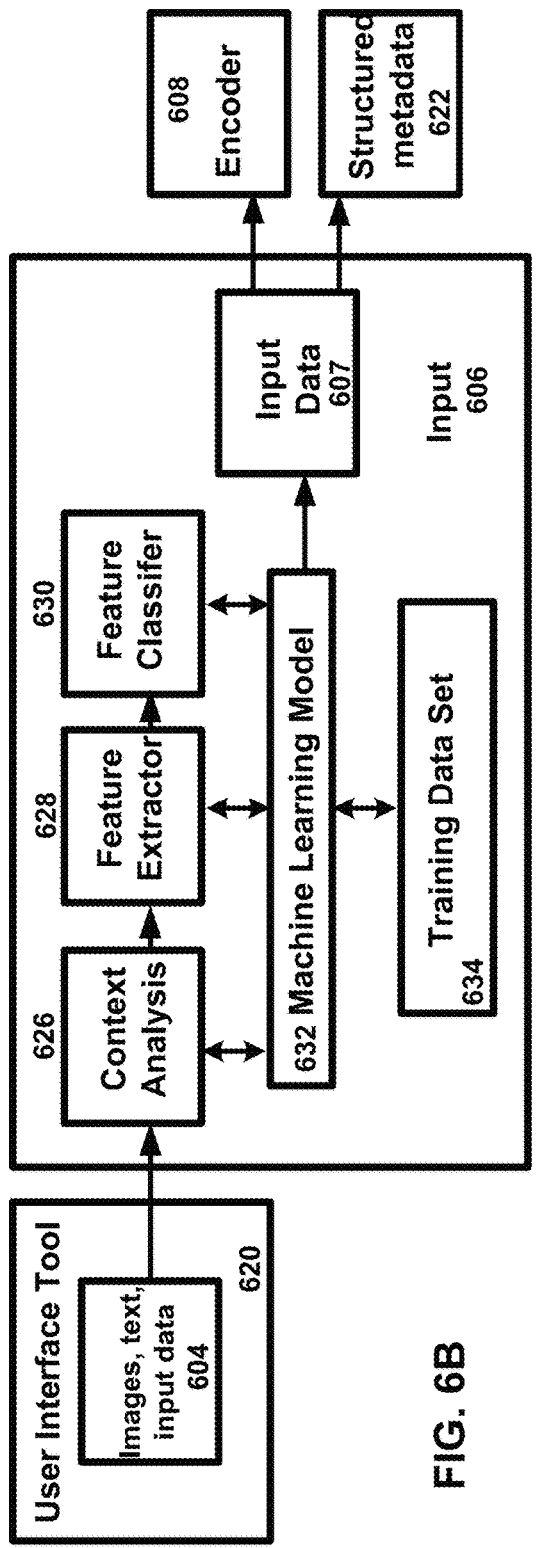
FIG. 6B illustrates additional processing that can be done to a user prompt (i.e., user input) used to generate image, in accordance with one implementation.

FIG. 6B illustrates, in one embodiment, additional processing that may be done to the input 606. A user interface tool 620 may be used to enable a user to provide an input request 604. The input request 604, as discussed above, may be images, text, structured text, or generally data. In one embodiment, before the input request is provided to the encoder 608, the input can be processed by a machine learning process that generates a machine learning model 632, and learns from a training data set 634. By way of example, the input data maybe be processed via a context analyzer 626 to understand the context of the request. For example, if the input is "space rockets for flying to the mars", the input can be analyzed 626 to determine that the context is related to outer space and planets. The context analysis may use machine learning model 632 and training data set 634 to find related images for this context or identify specific libraries of art, images or video. If the input request also includes an image of a rocket, the feature extractor 628 can function to automatically identify feature characteristics in the rocket image, e.g., fuel tank, length, color, position, edges, lettering, flames, etc. A feature classifier 630 can also be used to classify the features and improve the machine learning model 632. In one embodiment, the input data 607 can be generated to produce structured information that can be encoded by encoder 608 into the latent space. Additionally, it is possible to extract out structured metadata 622 from the input request. The structured metadata 622 may be, for example, descriptive text used to instruct the IGAI 602 to make a modification to a characteristic or change to the input images or changes to colors, textures, or combinations thereof. For example, the input request 604 could include an image of the rocket, and the text can say "make the rocket wider" or "add more flames" or "make it stronger" or some of other modifier intended by the user (e.g., semantically provided and context analyzed). The structured metadata 622 can then be used in subsequent latent space processing to tune the output to move toward the user's intent. In one embodiment, the structured metadata may be in the form of semantic maps, text, images, or data that is engineered to represent the user's intent as to what changes or modifications should be made to an input image or content.

Figure 6C:
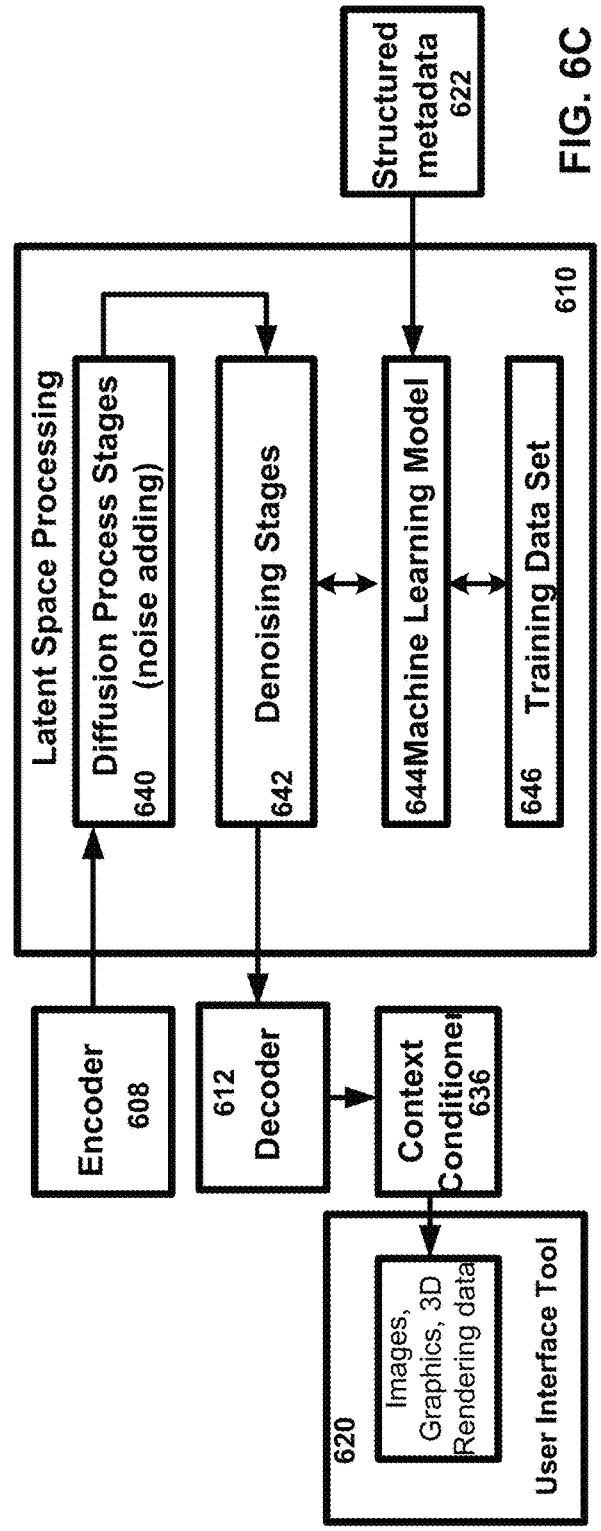
FIG. 6C illustrates processing of an output of an encoder using latent space processing, in accordance with one implementation.

FIG. 6C illustrates how the output of the encoder 608 is then fed into latent space processing 610, in accordance with one embodiment. A diffusion process is executed by diffusion process stages 640, wherein the input is processed through a number of stages to add noise to the input image or images associated with the input text. This is a progressive process, where at each stage, e.g., 10-50 or more stages, noise is added. Next, a denoising process is executed through denoising stages 642. Similar to the noise stages, a reverse process is executed where noise is removed progressively at each stage, and at each stage, machine learning is used to predict what the output image or content should be, in light of the input request intent. In one embodiment, the structured metadata 622 can be used by a machine learning model 644 at each stage of denoising, to predict how the resulting denoised image should look and how it should be modified. During these predictions, the machine learning model 644 uses the training data set 646 and the structured metadata 622, to move closer and closer to an output that most resembles the request in the input. In one embodiment, during the denoising, a U-Net architecture that has cross-attention layers may be used, to improve the predictions. After the final denoising stage, the output is provided to a decoder 612 that transforms that output to the pixel space. In one embodiment, the output is also upscaled to improve the resolution. The output of the decoder, in one embodiment, can be optionally run through a context conditioner 636 (similar to image normalizing module 330 of FIG. 1). The context conditioner is a process that may use machine learning to examine the resulting output to make adjustments to make the output more realistic or remove unreal or unnatural outputs. For example, if the input asks for "a boy pushing a lawnmower" and the output shows a boy with three legs, then the context conditioner can make adjustments with in-painting processes or overlays to correct or block the inconsistent or undesired outputs. However, as the machine learning model 644 gets smarter with more training over time, there will be less need for a context conditioner 636 before the output is rendered in the user interface tool 620.

Figure 7:
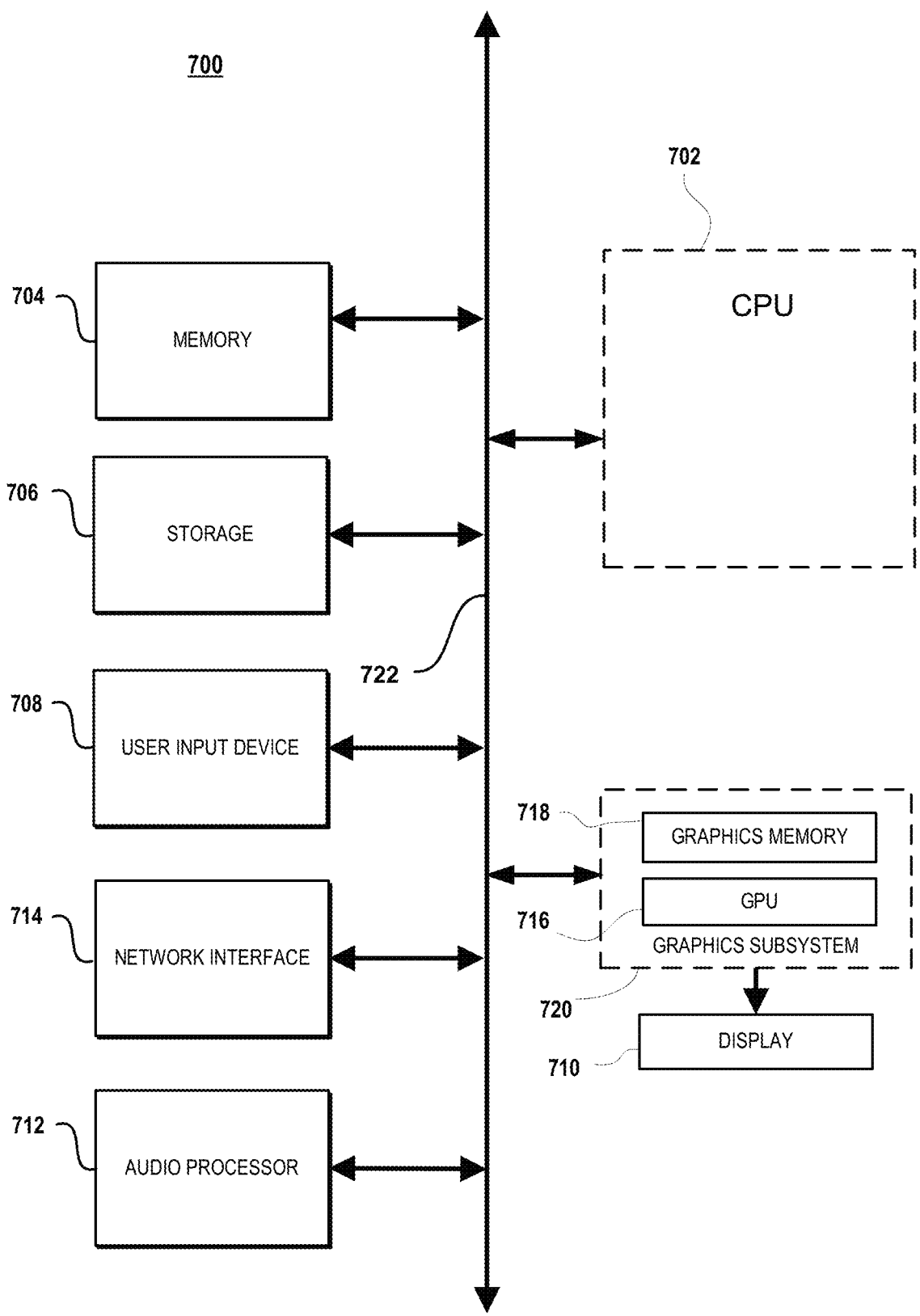
FIG. 7 illustrates components of an example server that can be used to perform aspects of the various implementations of the present disclosure.

FIG. 7 illustrates components of an example device 700 that can be used to perform aspects of the various embodiments of the present disclosure. This block diagram illustrates the device 700 that can incorporate or can be a personal computer, video game console, personal digital assistant, a server or other digital device, suitable for practicing an embodiment of the disclosure. The device 700 includes a CPU 702 for running software applications and optionally an operating system. The CPU 702 includes one or more homogeneous or heterogeneous processing cores. For example, the CPU 702 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 700 can be a localized to a player playing a game segment (e.g., game console), or remote from the player (e.g., back-end server processor), or one of many servers using virtualization in a game cloud system for remote streaming of gameplay to clients.

A memory 704 stores applications and data for use by the CPU 702. A storage 706 provides non-volatile storage and other computer readable media for applications and data and may include fixed disk drives, removable disk drives, flash memory devices, compact disc-ROM (CD-ROM), digital versatile disc-ROM (DVD-ROM), Blu-ray, high definition-DVD (HD-DVD), or other optical storage devices, as well as signal transmission and storage media. User input devices 708 communicate user inputs from one or more users to the device 700. Examples of the user input devices 708 include keyboards, mouse, joysticks, touch pads, touch screens, still or video recorders/cameras, tracking devices for recognizing gestures, and/or microphones. A network interface 714 allows the device 700 to communicate with other computer systems via an electronic communications network, and may include wired or wireless communication over local area networks and wide area networks, such as the internet. An audio processor 712 is adapted to generate analog or digital audio output from instructions and/or data provided by the CPU 702, the memory 704, and/or data storage 706. The components of device 700, including the CPU 702, the memory 704, the data storage 706, the user input devices 708, the network interface 714, and an audio processor 712 are connected via a data bus 722.

A graphics subsystem 720 is further connected with the data bus 722 and the components of the device 700. The graphics subsystem 720 includes a graphics processing unit (GPU) 716 and a graphics memory 718. The graphics memory 718 includes a display memory (e.g., a frame buffer) used for storing pixel data for each pixel of an output image. The graphics memory 718 can be integrated in the same device as the GPU 716, connected as a separate device with the GPU 716, and/or implemented within the memory 704. Pixel data can be provided to the graphics memory 718 directly from the CPU 702. Alternatively, the CPU 702 provides the GPU 716 with data and/or instructions defining the desired output images, from which the GPU 716 generates the pixel data of one or more output images. The data and/or instructions defining the desired output images can be stored in the memory 704 and/or the graphics memory 718. In an embodiment, the GPU 716 includes three-dimensional (3D) rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 720 periodically outputs pixel data for an image from the graphics memory 718 to be displayed on the display device 710. The display device 710 can be any device capable of displaying visual information in response to a signal from the device 700, including a cathode ray tube (CRT) display, a liquid crystal display (LCD), a plasma display, and an organic light emitting diode (OLED) display. The device 700 can provide the display device 710 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUS.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via the HMD. The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method comprising:
receiving a first image generated by an image generation artificial intelligence (IGAI) model based at least in part on a user prompt, wherein the first image includes image features influenced by content provided in the user prompt, wherein the content is identified to include a first keyword and a second keyword, the first keyword assigned a first weight based on context of the content and the second keyword assigned a second weight based on the context of the user prompt, the first image providing a visual representation of the user prompt;
analyzing the first image to identify the image features included within;
presenting the image features identified in the first image on a user interface of a client device for user selection for tuning;
presenting, on the user interface, one or more variations to at least one of the first keyword or the second keyword;
detecting selection of an image feature included in the image features presented at the user interface for tuning, the selection includes a tuning comment received from the user interface and identifying selection of variations to the keywords of the user prompt, the tuning comment analyzed to identify variations to a sequence of the keywords based on the selection of variations to the keywords included within the tuning comment, the variations refining at least one of the first weight or the second weight, and assigning relative weight to the sequence of the keywords and the context of the user prompt, the relative weight, the first weight, and the second weight utilized to influence the IGAI model to steer at least one image feature of a second image to exhibit a style expressed in the tuning comment; and
generating an adjusted the second image using the AGAI model by tuning the image feature of the first image selected at the user interface, the tuning performed by influencing a change in the image feature in accordance to the relative weight, the first weight, and the second weight so that the at least one image feature in the second image exhibits the style, the second image returned to the client device for rendering, in response to a request to tune the first image received from the user interface.

2. The method of claim 1, wherein the first image includes additional image features in addition to the image features influenced by the content of the user prompt, the additional image features are identified and included in the first image by the IGAI model.

3. The method of claim 2, wherein the image features presented at the user interface for tuning include the additional image features included in the first image.

4. The method of claim 1, wherein detecting selection further includes,
annotating the image feature selected for tuning, the annotation defining the tuning comment to be used by the IGAI model to influence generating the second image.

5. The method of claim 1, wherein presenting the image features includes presenting a node map for the first image at the user interface, the node map including a plurality of nodes with each node of the plurality of nodes corresponding to the selected image features.

6. The method of claim 5, wherein certain nodes of the plurality of nodes in the node map are inter-connected to represent inter-relationship of corresponding image features and certain other nodes of the plurality of nodes stand independent.

7. The method of claim 5, wherein image features of the first image identified for tuning includes the image features influenced by the content provided in the user prompt, and
wherein the node map presented at the user interface includes the plurality of nodes that correspond with the image features influenced by the content provided in the user prompt.

8. The method of claim 5, wherein the image features of the first image identified for tuning includes the image features influenced by the content and additional image features identified by the IGAI model and included in the first image, and
wherein the node map presented at the user interface includes the plurality of nodes that correspond with the image features and the additional image features.

9. The method of claim 1, wherein the tuning comment includes text input to influence the change in the image feature selected at the user interface.

10. The method of claim 1, wherein the tuning comment includes text input and image input to influence the change in the image feature selected at the user interface.

11. The method of claim 10, wherein the text input includes an inclusivity clause identifying a specific feature of the image input to include in the image feature when influencing the change, and the second image generated with the at least one image feature influenced by the style of the specific feature.

12. The method of claim 10, wherein the text input includes an exclusivity clause identifying a specific feature of the image input to exclude from the image feature when influencing the change, the second image generated with the at least one image feature to not exhibit the style of the specific feature.

13. The method of claim 1, wherein the user prompt includes an image prompt and a text prompt.

14. The method of claim 1, wherein detecting selection of image feature further includes, dynamically updating the user interface to include one or more pre-defined options available to influence a style of the image feature, wherein the one or more pre-defined options representing the tuning comment are identified based on the image feature selected for tuning; and
responsive to detecting selection of a pre-defined option at the user interface, generating the second image to include the at least one image feature matching a second style specified in the pre-defined option.

15. The method of claim 1, wherein the selection of the image feature indicates at least one requirement for the first image is not met.

16. The method of claim 1, wherein the first image is at least one of a virtual asset defined for a video game, a virtual logo used to represent an entity, or a virtual art product.

17. A method comprising:
receiving a first image generated by an image generation artificial intelligence (IGAI) model based at least in part on a user prompt, wherein the first image includes image features influenced by content provided in the user prompt, the first image providing a visual representation of the user prompt;
analyzing the first image to identify the image features included within;
presenting a node map for the first image on a user interface of a client device for user selection, the node map including a plurality of nodes that correspond to the image features identified in the first image;
detecting selection of a node from the node map, the node corresponds to an image feature included in the image features of the first image selected for tuning, the selection includes a tuning comment received from the user interface to influence the IGAI model to steer at least one image feature of a second image to exhibit a style expressed in the tuning comment, the tuning comment includes at least a text input, the text input parsed to identify keywords and a sequence of keywords used to define a context, each of the keywords and the sequence of keywords assigned a relative weight based on the context of the tuning comment; and
generating the second image using the AGAI model by tuning the image feature associated with the node selected at the user interface, the tuning performed by influencing the at least one image feature to be generated in accordance with the relative weights of the keywords and the sequence of keywords identified from the tuning comment so that the at least one image feature in the second image exhibits the style expressed in the tuning comment, the second image returned to the client device for rendering, in response to a request received from the user to tune the first image.

18. The method of claim 17, wherein the plurality of nodes in the node map are arranged to provide a visual representation of inter-relationship of the image features in the first image.

* * * * *